United States Patent [19]
Whitlock

[11] Patent Number: 5,735,141
[45] Date of Patent: Apr. 7, 1998

[54] METHOD AND APPARATUS FOR PURIFYING A SUBSTANCE

[75] Inventor: Walter H. Whitlock, Chapel Hill, N.C.

[73] Assignee: The BOC Group, Inc., New Providence, N.J.

[21] Appl. No.: 781,463

[22] Filed: Jan. 10, 1997

Related U.S. Application Data

[63] Continuation-in-part of Ser. No. 660,147, Jun. 7, 1996, abandoned.

[51] Int. Cl.$^6$ .................................................. F25J 1/00
[52] U.S. Cl. ............................. 62/620; 62/903; 62/905
[58] Field of Search ............................. 62/620, 903, 905

[56] References Cited

U.S. PATENT DOCUMENTS

| | | | |
|---|---|---|---|
| 2,327,134 | 8/1943 | Schuftan | 62/620 |
| 2,509,044 | 5/1950 | Patterson | 62/620 |
| 4,025,398 | 5/1977 | Haselden | 202/158 |
| 4,559,108 | 12/1985 | Ahlberg | 202/158 |
| 5,257,505 | 11/1993 | Butts | 62/620 |
| 5,499,506 | 3/1996 | Nagamura | 62/620 |

Primary Examiner—Roanld C. Capossela
Attorney, Agent, or Firm—David M. Rosenblum; Salvatore P. Pace

[57] ABSTRACT

A method and apparatus for purifying a substance in which the substance is rectified within first and second distillation columns to produce a tower overhead in the second distillation column, lean in both heavy and light impurities. The column bottoms produced within the second distillation columns is boiled to provide boil-up within the second distillation column, thereby to initiate formation of an ascending vapor phase. A vapor stream in removed from the second distillation and then fed into a bottom region of the first distillation column to initiate formation of the ascending vapor phase therein. The vapor stream removed from the second distillation column is formed from the ascending vapor phase produced within the second distillation column. The second distillation column is reboiled by a reboiler that can include a reservoir containing a heat exchange fluid that condenses against boiling the column bottoms provided in the second distillation column. The type of heat exchange fluid utilized is selected to have a condensation temperature above bubble point temperature of the column bottoms of the second distillation column.

15 Claims, 1 Drawing Sheet

METHOD AND APPARATUS FOR PURIFYING A SUBSTANCE

This is a continuation-in-part of Application Ser. No. 08/660,147 filed Jun. 7, 1996, now abandoned

BACKGROUND OF THE INVENTION

The present invention relates to a method and apparatus for purifying a substance in which the substance is rectified in first and second distillation columns to remove heavy and light impurities from the substance. More particularly, the present invention relates to such a method and apparatus in which the first rectification column produces a column bottoms lean in light impurities and the second distillation column further rectifies the column bottoms of the first distillation column to produce the purified substance. Even more particularly, the present invention relates to such a method and apparatus in which boil-up for both of the first and second distillation columns is provided by reboiling the columns bottoms produced within the second distillation column. Still even more particularly, the present invention relates to a reboiler in which a heat exchange fluid employed within the reboiler can be selected in accordance with the substance to be purified.

Many different types of industrial processes require substances of ultra-high purity or impurity contents of less than about 5 parts per million. Nowhere is this need more acute than in the electronics industry in which purified process streams, such as etching substances, are required in the production of semiconductors. Impurities such as moisture and hydrocarbons can destroy a production run and thereby result in heavy monetary losses.

It is known to purify substances through distillation such that a purified substance is produced that is lean in light and heavy impurities. In this regard, light and heavy impurities are impurities that are either more or less volatile than the substance to be purified. An example of distillation applied to the purification of monosilane can be found in U.S. Pat. No. 5,499,506. In accordance with the patent, a monosilane feed gas is liquefied within a bottom condenser/reboiler located in a bottom region of a distillation column to partially liquefy the feed. This partial liquefaction acts to separate the heavy impurities such as dichlorosilane and trichlorosilane from the feed. Hydrogen, monosilane and monochlorosilane which have not been liquefied are introduced between two mass transfer sections of the rectification column to produce a tower overhead. A top condenser/reboiler located within a top region of the distillation column condenses the tower overhead to reflux the distillation column and thereby to produce a column bottoms reboiled by the bottom condenser/reboiler. The tower overhead is then introduced into a second column for further rectification. This further rectification separates monosilane from the lighter impurities such as hydrogen to produce a purified liquid monosilane having an impurity content of approximately 100 parts per million.

The distillation technique by U.S. Pat. No. 5,499,506 requires two condenser/reboilers to produce boil-up, each of which adds a level of complexity and expense to the practice of such technique. For instance, the condenser/reboilers used in this patent produce a large inventory of monosilane within the distillation column system. Furthermore, the column operating pressure must be sufficiently high to effect the condensation against the reboiling. The system of condenser/reboilers also requires a sophisticated and automated control of the distillation process. An additional problem with the '506 patent and like systems is that the apparatus and control must be optimized for the production of monosilane. Hence, separate column designs and/or systems are required for the purification of substances other than monosilane.

As will be discussed, the present invention provides a distillation method and apparatus which is capable of obtaining purified substances having an impurity content of less than 5 parts per million by volume that is far simpler in its implementation and control than methods and apparatus of the prior art. Additionally, the method and apparatus of the present invention can be rapidly reconfigured to purify a variety of substances.

SUMMARY OF THE INVENTION

The present invention relates to a method of purifying a substance having heavy and light impurities in which the substance in a first distillation column to produce a first column bottoms lean in the light impurities and a first tower overhead concentrated in the light impurities. A liquid stream of the columns bottoms is introduced into a second distillation column to produce a second column bottoms concentrated in the heavy impurities and a second tower overhead lean in both the heavy and light impurities. The second column bottoms is boiled within the second distillation column to provide boil-up within the second distillation column and thereby to initiate formation of an ascending vapor phase within the second distillation column. A vapor stream is withdrawn from the second distillation column. The vapor stream is composed of the ascending vapor phase. The vapor stream is introduced into the first distillation column to also provide boil-up within the first distillation column. A product stream is withdrawn from the second distillation column that is composed of the second tower overhead.

In another aspect, the present invention provides an apparatus for purifying a substance having heavy and liquid impurities. In accordance with this aspect of the present invention a first distillation column is provided for rectifying the substance to produce a first column bottom lean in the light impurities and a first tower overhead concentrated in the light impurities. A second distillation column is provided for rectifying a liquid stream composed of the first column bottoms. The second distillation column from such rectification produces a second column bottoms concentrated in the heavy impurities and a second tower overhead lean in both the heavy and light impurities. A reboiler means is provided for reboiling the second column bottoms within the second distillation column to provide boil-up within the second distillation column and thereby to initiate formation of an ascending vapor phase within the second distillation column. A means is provided for withdrawing a vapor stream from the second distillation column; the second vapor stream being composed of the ascending vapor phase. A means is provided for introducing the vapor stream into the first distillation column to provide boil-up within the first distillation column. A means is provided for withdrawing a product stream, composed of the second tower overhead, from the second distillation column.

In yet still a further aspect the present invention provides a method of separating two mixtures in which a first and then a second of the two mixtures is introduced into a distillation column to produce a tower overhead and a column bottoms for each of the first and second of the two mixtures. The column bottoms is boiled within the distillation column to provide boil-up within the distillation column and thereby to initiate formation of an ascending vapor phase within the distillation column. The column bottoms is boiled for the first of the two mixtures by vaporizing a first heat exchange fluid having a condensation temperature above bubble point temperature of the column bottoms produced for the first of the two mixtures and by indirectly exchanging heat between the column bottoms and the first heat exchange fluid such that the heat exchange fluid condenses and the first column bottom boils. The column bottoms being boiled for the second of the two mixtures by vaporizing a second heat exchange fluid having a second condensation temperature above bubble point temperature of the column bottoms produced for the second of the two mixtures and by indirectly exchanging heat between the column bottoms and second heat exchange fluid such that the second heat exchange fluid condenses and the second column bottom boils.

The double rectification of the feed in accordance with the present invention allows ultra-high purities to be obtained. Since the same boil-up is used in both columns, only one reboiler is required to produce the boil-up rather than a system of condenser/reboilers in which process fluids are being condensed against the reboiling thereof. This results in a distillation column system that is of simpler design and control than prior art systems. As will be discussed, linkage between the columns can be simplified over the prior art to further simplify fabrication and control. Since there is no simultaneous condensation and reboiling of process fluids, the distillation column system and method of the present invention allows for operating pressures that are lower than those of the prior art. Moreover, the use of the reboiler employing a replaceable heat exchange fluid allows different substances to be purified through the use of the same apparatus or at least an apparatus of common design.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

DETAILED DESCRIPTION

Figure 1:
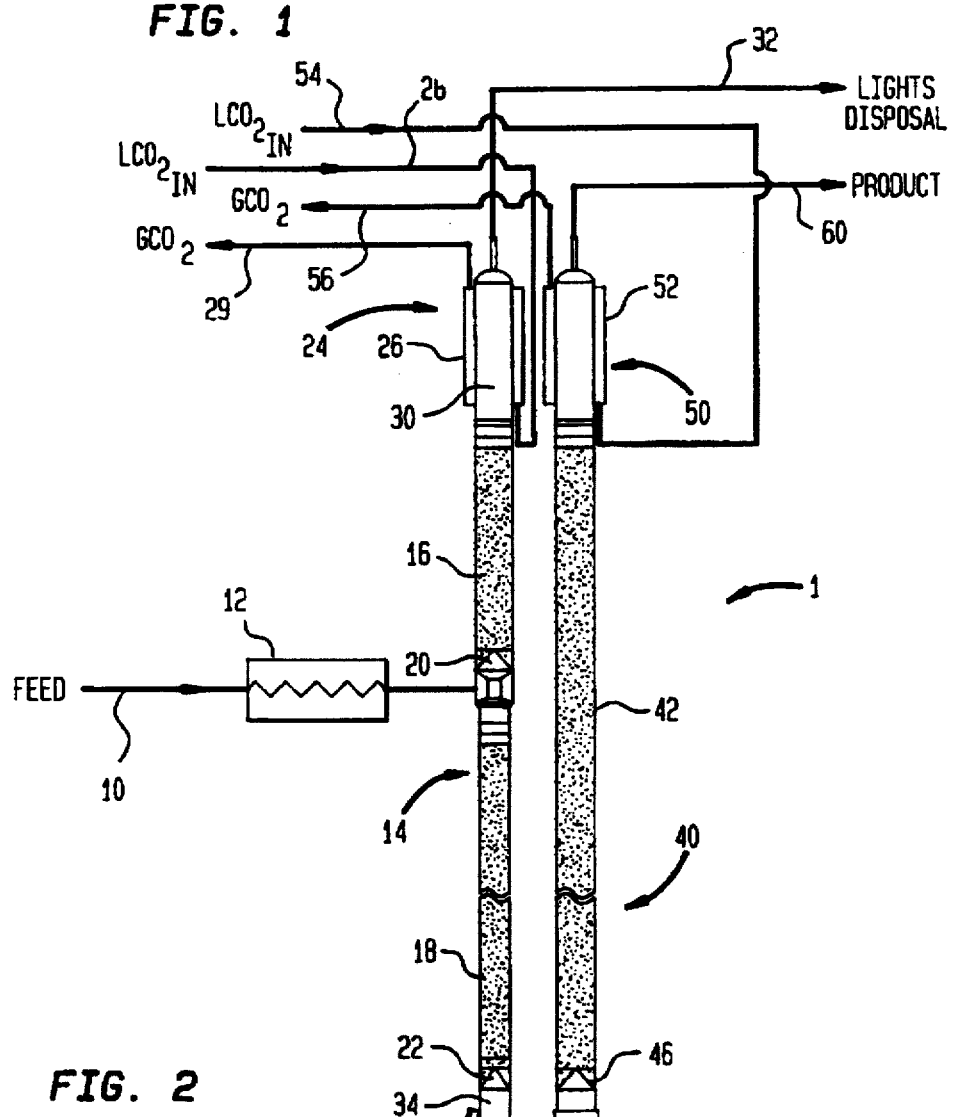
FIG. 1 is a perspective view of an apparatus for carrying out a method in accordance with the present invention.
Figure 2:
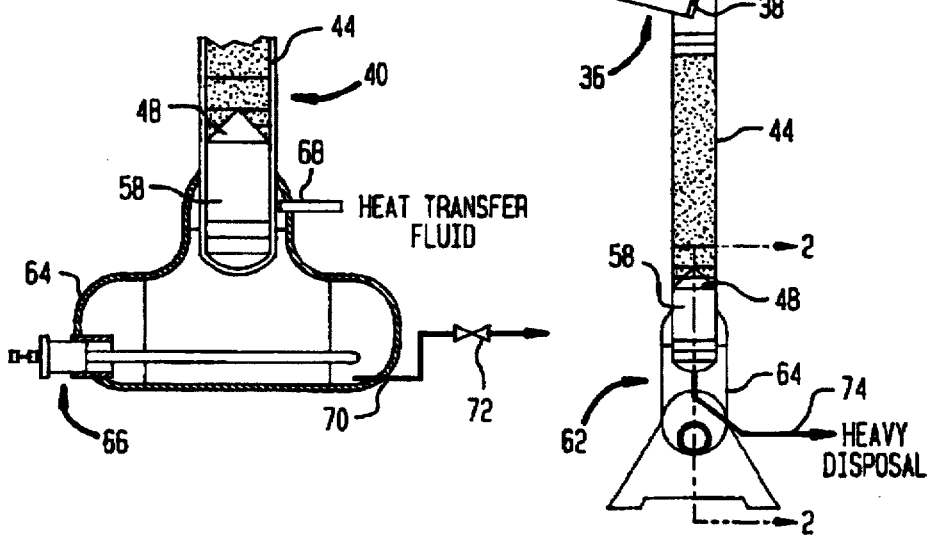
FIG. 2 is a fragmentary sectional view taken along line 2—2 of FIG. 1 illustrating a reboiler in accordance with the present invention.

With reference to FIG. 1 an apparatus 1 is illustrated for purifying a substance having heavy and light impurities. As used herein and in the specification the term, "light impurities" means impurities that are more volatile than the substance to be purified. The term "heavy impurities", as used herein and in the claims means impurities that are less volatile than the substance to be purified. By way of example, in case silane is a substance to be purified in apparatus 1, then the light impurities will include nitrogen, hydrogen, carbon monoxide and methane. The heavy impurities will include carbon dioxide, chlorosilanes, higher polymers of silanes, siloxanes, ethane, ethylene, propylene and moisture. If the substance to be purified in apparatus 1 consists of hydrogen bromide, then the light impurities would comprise nitrogen, air, hydrogen chloride, hydrogen and carbon dioxide. Heavy impurities would include chlorine, moisture, bromine and a volatile metallic bromides other than bromine compounds. It is to be noted that apparatus 1 could be used to purify substances that include silane, carbon dioxide, nitrogen, hydrogen, methane, monochloro-silane, dichloro-silane, trichlo-silane, ethane, propane, hydrogen bromide and hydrogen chloride and boron trichloride.

A feed stream 10 is cooled in a heat exchanger 12 to a temperature suitable for its rectification. Feed stream 10 contains a substance to be purified and heat exchanger 12 utilizes coolant that is selected to provide the necessary refrigeration to appropriately cool feed stream 10. In case of hydrogen bromide, boron trichloride or tungsten hexaflouride such a coolant can be liquid carbon dioxide.

Feed stream 10 after being cooled is fed into the first distillation column 14. Distillation columns 14 has rectifying and stripping sections 16 and 18 that are filled with dumped packing. The dumped packing of rectification section 16 is supported on support grid 20. The dumped packing within stripping section 18 is supported on support grid 22.

First distillation column 14 is provided with a head condenser 24 which consists of an outer section 26 which is fed with a liquid carbon dioxide coolant through a feed line 28. Outer section 26 surrounds an inner section 30 in which rising vapor is partly condensed to reflux first distillation column 14. The resultant vaporized carbon dioxide is discharged through a discharge line 29.

The substance to be purified is thus rectified within first distillation column 14 to produce a first tower overhead within inner section 30 of heat exchanger 24. First tower overhead is concentrated in the light impurities. Excess light impurities that are not required for reflux of first distillation column 14 are disposed via a disposal line 32 connected to the top of heat exchanger 24. The rectification also produces a column bottoms in a bottom region 34 of first distillation column 14. The column bottoms is lean in the light impurities and collects within a downwardly angled pipe section 36 having a baffle 38. The column bottoms produced within first distillation column 14 overflows baffle 38 and is thus fed to a second distillation column 40 having an upper rectifying section 42 and a lower stripping section 44. Dumped packing is supported within upper rectifying section 42 by support grid 46. Dumped packing is supported within lower stripping section 44 by support grid 48.

Second rectification column 40 is provided with a head condenser 50 of the same design as head condenser 24. Head condenser 50 has an outer section 52 into which liquid carbon dioxide is fed through a feed line 54. The tower overhead produced within distillation column 14 is in part condensed to reflux column 40 through the use of the liquid carbon dioxide coolant provided within head condenser. This causes the liquid carbon dioxide to vaporize and the vapor is discharged through a discharge line 56.

Second distillation column 40 functions to rectify the column bottoms produced from the first distillation column 14. This rectification produces a second column bottoms in a bottom region 58 thereof that is concentrated in the heavy impurities. The tower overhead which passes into second head condenser 52 is lean in both the heavy and light impurities and thus constitutes purified product which is removed by means of a discharge line 60.

In order to provide boil-up for second distillation column 40 and ultimately first distillation column 14, a reboiler 62 is provided having a reservoir 64 through which bottom region 58 of second distillation column projects. This reservoir is designed to contain a heat exchange fluid which is heated by an electrical heating element 66. Heat transfer fluid enters reservoir 64 via an inlet 68 and is discharged through a discharge line 70 provided with a valve 72. The heat transfer fluid utilized is one having a condensation temperature above the bubble point temperature of the second column bottoms produced within second distillation column 40. This causes the second column bottoms to boil-up within bottom region 58 of second distillation column 40 against the condensation of the heat exchange fluid. In order to prevent accumulation of the heavy components contained within the substance to be purified, bottom region 58 of distillation column 40 is provided with a discharge line 74 to permit discharge of accumulated liquid.

The heat exchange fluid is selected in accordance with the substance to be purified. In case of silane, xenon might be used. R 22 would be used for hydrogen bromide and R 124 would be used for boron trichloride or tungsten hexaflouride. Heat exchanger 62 of course could be used in other applications and as such is not limited solely to the illustrated purification columns. It has broader application to distillation in general. In order to first purify two substances for instance silane and then boron trichloride, after flushing the columns with nitrogen, the heat exchange fluid would simply be changed to that appropriate for boron trichloride. It is to be noted that prior to being distilled, the boron trichloride would be heated to vaporization at about 50° C. and then partially cooled to 30° C. so that it would enter apparatus 1 as a vapor. Furthermore, the coolant for heat exchanger 12 and head condensers 24 and 50 would also be changed from nitrogen for silane and then to carbon dioxide for boron trichloride. Another point to bear in mind is that the materials used in apparatus 1 must be compatible with the intended substance to be purified. If for instance corrosive substances such as boron trichloride are to be purified, then apparatus 1 should be constructed of nickel. In the event that non-corrosive substances are to be purified such as silane, then the material can be stainless steel.

It is to be noted that in case of boron trichloride, after having been heated to 50° C., the resulting vapor at such temperature can be directly introduced into first distillation column 14 without any further cooling. Such vapor will then cool to a column operating temperature of 30° C. shortly after entry. Although the application of the present invention is not limited to the illustrated embodiment, as will become evident from a detailed description of such illustrated embodiment, the entire distillation column system is of such small scale that superheated entry of the feed, although perhaps thermodynamically inefficient, does not result in any appreciable increase in operating cost due to such small scale operation. In fact, as could be appreciated by those skilled in the art, any substance could be introduced as a superheated gas. However the heat loading on the head condensers would increase and a point, for instance in case nitrogen, would be reached in which the distillation would not be cost effective and precooling would be desired. As another extreme, a liquid feed or a subcooled liquid feed could be used and as such, there would be no requirement for heat exchanger 12 to be included.

The rising vapor stream initiated by the boil-up produced by heating bottom region 58 of distillation column 40 initiates an ascending vapor phase within column 40 which due to the packing elements contacts the descending liquid phase which is initiated by condensation of tower overhead through second head condenser 50. The vapor rises and is carried to first distillation columns 14 by passage over baffle plate 38 of downwardly angled pipe 36. Such vapor thereby provides boil-up and initiation of an ascending vapor phase within first distillation column 14. This ascending vapor phase contacts the descending liquid phase produced through condensation of tower overhead produced by first head condenser 24.

It is to be noted here that downwardly angled pipe 36 is a preferred method of coupling first and second distillation columns 14 and 40 in that it is self-regulating and does not require extensive controls. It is to be noted that this type of connection between distillation columns also has wider applicability than the illustrated embodiment.

By way of example, apparatus 1 can be constructed such that first distillation column 14 has an upper an upper rectifying section of approximately 12 inches and a lower stripping section of approximately 96 inches. Upper rectifying section can be constructed from a 1½ inch tube. Lower stripping section is constructed from a 1 inch tube. Upper rectification section 42 of second rectification column 40 can be constructed from a 1½ inch schedule 40 pipe. Lower stripping section 44 of second distillation column 40 can be constructed by a 12 inch length of schedule 40 pipe. All of such sections can be filled with MELAPAK, Type B dumped packing. A stream of silane at a rage of 4 standard liters per minute was introduced into first distillation column 14 at a temperature of approximately 10° C. A 20% recovery was obtained having an impurity rate that was reduced to 5 parts per billion.

While the invention has been described with reference to a preferred embodiment, as will occur to those skilled in the art, numerous changes, additions and omissions can be made without departing from the spirit and scope of the present invention.

I claim:

1. A method of purifying a substance having heavy and light impurities comprising:

rectifying said substances in a first distillation column to produce a first column bottoms lean in said light impurities and a first tower overheat concentrated in said light impurities;

introducing a liquid stream of said column bottom into a second distillation column to produce a second column bottoms concentrated in said heavy impurities and a second tower overhead lean in both said heavy and light impurities;

boiling said second column bottoms within said second distillation column to provide boil-up within said second column and thereby to initiate formation of an ascending vapor phase within said second distillation column;

withdrawing a vapor stream from said second distillation column, composed of said ascending vapor phase, and introducing said vapor stream into said first distillation column to provide boil-up within said first distillation column; and withdrawing a product stream from said second distillation column composed of said second tower overhead.

2. The method of claim 1, wherein said substance is carbon dioxide, nitrogen, hydrogen, methane, silane, dichlorosilane, trichlorosilane, ethane, propane, hydrogen chloride, hydrogen bromide, or boron trichloride.

3. The method of claim 1 or claim 2, wherein said boil-up is provided by vaporizing a heat exchange fluid having a condensation temperature above bubble point temperature of said second column bottoms and indirectly exchanging heat between the second column bottoms and said heat exchange fluid such that said heat exchange fluid condenses and said second column bottom boils.

4. The method of claim 3, wherein said vapor stream is withdrawn from said second distillation column at a point situated at the entry of said liquid stream thereto.

5. The method of claim 3, wherein said substance is cooled to a temperature suitable for its rectification.

6. An apparatus for purifying a substance having heavy and light impurities comprising:

a first distillation column for rectifying said substance to produce a first column bottoms lean in said light impurities and a first tower overheat concentrated in said light impurities;

a second distillation column for rectifying a liquid stream composed of said first column bottoms, thereby to produce a second column bottoms concentrated in said heavy impurities and a second tower overhead lean in both said heavy and light impurities;

reboiler means for boiling said second column bottoms within said second distillation column to provide boil-up within said second column and thereby to initiate formation of an ascending vapor phase within said second distillation column;

means for withdrawing a vapor stream from said second distillation column, composed of said ascending vapor phase, and for introducing said vapor stream into said first distillation column to provide boil-up within said first distillation column; and means for withdrawing a product stream from said second distillation column composed of said second tower overhead.

7. The apparatus of claim 6, wherein said reboiler means includes a comprises:

vaporization means for vaporizing a heat exchange fluid having a condensation temperature above bubble point temperature of said second column bottoms; and indirect heat exchange means for indirectly exchanging heat between the second column bottoms and said heat exchange fluid such that said heat exchange fluid condenses and said second column bottom boils.

8. The apparatus of claim 7, wherein:

said indirect heat exchange means comprises a reservoir containing said heat exchange fluid;

said second distillation column has a bottom region projecting into said reservoir; and said vaporization means comprises an electric heating element located within said reservoir.

9. The apparatus of claim 6 or claim 8, wherein said withdrawing and introduction means is configured such that said vapor stream is withdrawn from said second distillation column at a point situated at the entry of said liquid phase thereto.

10. The apparatus of claim 6 or claim 8, wherein said first and second distillation columns have first and second head condensers, each comprising two concentric cylinders defining an outer annular jacket for receiving a coolant and an inner tube in communication with top regions of said distillation columns for receiving first and second tower overheads.

11. The apparatus of claim 10, wherein said withdrawing and introduction means comprises a pipe downwardly sloping towards said second distillation column, said pipe sized such that said vapor stream and said liquid stream flow past one another within said pipe in countercurrent directions wherein said first and second distillation columns have first and second head condensers, each comprising two concentric cylinders defining an outer annular jacket for receiving a coolant and an inner tube in communication with top regions of said distillation columns for receiving first and second tower overheads.

12. The apparatus of claim 6 or claim 8 further comprising cooling means for cooling said substance to a temperature suitable for its rectification.

13. The apparatus of claim 11 further comprising cooling means for cooling said substance to a temperature suitable for rectification.

14. A method of separating two mixtures comprising:

introducing a first and then a second of said two mixtures into a distillation column to produce a tower overhead and a column bottoms for each of said first and second of said two mixtures;

boiling said column bottoms within said distillation column to provide boil-up within said distillation columns and thereby to initiate formation of an ascending vapor phases within said distillation column;

said column bottoms being boiled for said first of said two mixtures by vaporizing a first heat exchange fluid having a condensation temperature above bubble point temperature of the column bottoms produced for the first of said two mixtures and by indirectly exchanging heat between the column bottoms and said first heat exchange fluid such that said first heat exchange fluid condenses and said first column bottom boils; and said column bottoms being boiled for said second of said two mixtures by vaporizing a second heat exchange fluid having a condensation temperature above bubble point temperature of the column bottoms produced for the second of said two mixtures and by indirectly exchanging heat between the column bottoms and said second heat exchange fluid such that said second heat exchange fluid condenses and said second column bottom boils.

15. The method of claim 14, wherein:

said distillation column extends into a reservoir having means for heating said first and second heat exchange fluids; and said first heat exchange fluid is replaced by said second heat exchange fluid prior to said second of said two mixtures is introduced into said distillation column.

* * * * *